June 15, 1937. A. M. BANK Re. 20,406

UPHOLSTERY CONSTRUCTION

Original Filed July 20, 1929

INVENTOR.
Albert M. Bank
BY
Morris Sprecher
ATTORNEY

Reissued June 15, 1937 Re. 20,406

UNITED STATES PATENT OFFICE 20,406

UPHOLSTERY CONSTRUCTION

Albert M. Bank, Jersey City, N. J., assignor to Sylvia Bank, Jersey City, N. J.

Original No. 1,894,262, dated January 17, 1933, Serial No. 379,686, July 20, 1929. Application for reissue January 16, 1935, Serial No. 2,053

12 Claims. (Cl. 155—179)

This invention relates to upholstery construction such as seat structure for chairs, couches, and the like articles.

An object of this invention is to provide structure of the character described having means for preventing the webbing from stripping or giving way at the points where the facing is secured to the seat frame.

Another object of this invention is to provide practical and efficient means auxiliary to the usual foundation springs for adding to the cushioning effect and comfort of the seat.

A further object of this invention is to provide structure of the character described having supplementary supporting means for adding to the strength of the seat.

A still further object of the invention is to provide in a seat of the character described, means for permitting a relatively large deflection or give for adding to the comfort of the seat and yet preventing the underside of the seat from bellying or extending below the frame.

Still another object of this invention is to provide in structure of the character described improved means for supporting the foundation springs whereby strain on the webbing is relieved.

A still further object of this invention is to provide a compact and rugged structure of the character described which shall be comparatively inexpensive to manufacture and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of a chair frame having a seat made in accordance with the invention;

Figure 1:
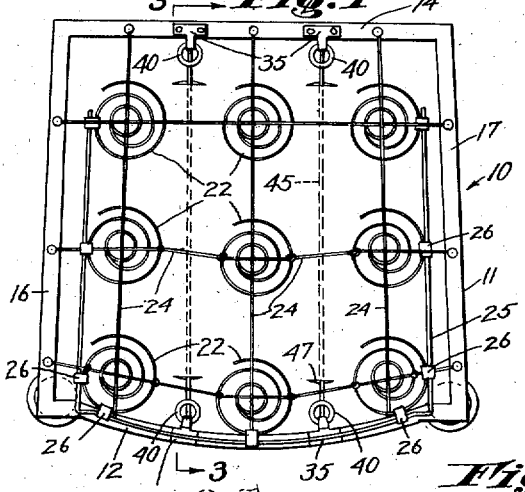

Referring now in detail to the drawing, 10 designates the bottom portion of a chair provided with a seat structure made in accordance with the invention. The chair comprises a frame 11 having a front wall 12, a rear wall 14 and side walls 16 and 17 and is supported by legs 18 of any suitable construction. The frame 11 is here shown, for the purposes of illustration only, as a chair frame, it being understood that the invention is applicable to couches, automobile seats or any similar upholstery having either tight seat construction or loose or removable cushions.

Directly fixed or secured adjacent the outer edges thereof and around the entire perimeter thereof to the bottom edge portion or underside 19 of the frame 11 as by tacks 21*a* or in any other suitable manner, is a webbing 20, preferably in the form of a one-piece webbing made of canvas, burlap or the like material. Mounted on the webbing are the usual suitable spaced compression, foundation springs 22 attached at their lower ends to said webbing in any suitable manner to prevent shifting of said springs, and interconnected at the upper ends thereof by the usual cross cords 24 and by a metal frame 25 having portions 26 engaging the upper convolutions of said springs, or in any other suitable manner. A U-shaped wire 28 is secured to the inner side of the side walls 16, 17 and rear wall 14, somewhat above the lower edge portions 19 thereof to bring the edge portions 29 of the webbing into contact with the inner surface of said side and rear walls, and thus raise the level of the webbing above the plane of said lower edge portion 19 of the frame. This construction permits a substantial deflection of the webbing and yet prevents formation of a belly on the underside of the seat below the frame 11. The end portion 32 of the webbing adjacent the front wall 12, however, may extend towards the bottom edge portion 19 of said front wall.

Figure 2:
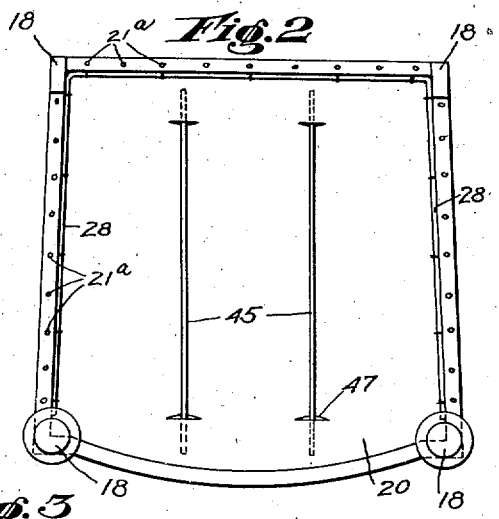
Fig. 2 is a bottom plan view of the chair shown in Fig. 1.
Figure 3:
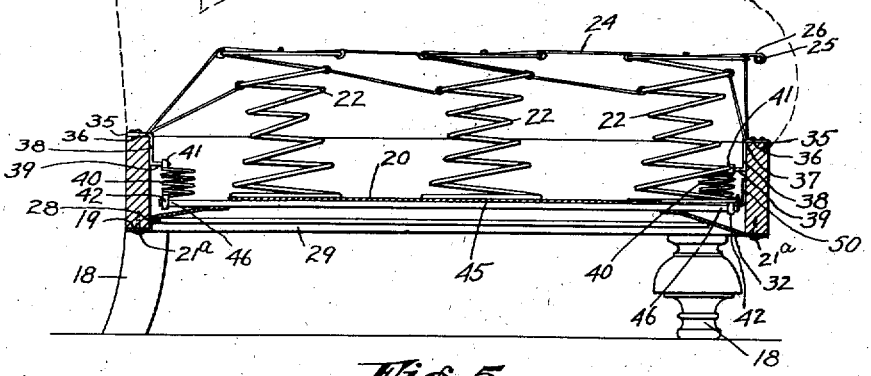
Fig. 3 is a cross-sectional view taken on line 3—3 of Fig. 1.

It will now be clear that with the construction described thus far, the webbing is fixed to the frame on all four sides thereof and weight placed on the seat will cause the usual springs 22 to be compressed and the strain thereby transferred to the webbing. With seat constructions now in use, wherein the webbing takes the entire weight applied to the springs, a great strain is thereby imposed on the tacks or other means fastening the webbing to the frame, thus often causing stripping of the webbing at the point where same is fastened to the frame. For substantially obviating this difficulty, I have provided means for relieving strain on the webbing and for partially carrying the load impressed on the seat. To this end, a pair of straps or brackets 35 are secured in aligned relation to a pair of opposite walls of the chair, such as the front and rear walls 12 and 14. Each of said straps 35 is provided with a portion 36, preferably secured to the top edge 37 of said walls, and with a depending portion 38 having an inward extension 39. Dependingly secured to each of said extensions 39 is a strong, helical tension spring 40 having an upper end portion 41 engaging said extension. Said springs 40 preferably terminate at the lower ends thereof in eyelet portions 42 extending substantially in planes parallel to said front and rear walls. A rod 45 of metal or any other suitable material is provided with end portions 46 received in said eyelets 42 for suspending said rod from said springs 40. The webbing 20 is provided with a pair of spaced slits 47 adjacent the front and rear portions thereof through which the rod 45 passes. Thus, the main or central portion of the rod extends beneath the webbing 20 and support intermediate portions of the webbing whereas the outer ends 46 of said rod extend through said slits for connection to the helical springs 40. As shown for the purpose of illustration only, in Figs. 1 and 2, a pair of parallel rods 45 are used, it being understood however, that any number of such rods arranged in any suitable manner may be provided. As clearly shown in Fig. 3, the rods 45 are normally on a higher level than the wire 28, thus lifting the webbing above said level and permitting deflection thereof below said level. The level of wire 28 is preferably such that the belly or sag caused by imposing weight on the seat will not protrude below the lower edge of the frame 11.

It will now be seen that upon imposing weight on the seat, compression of the foundation springs 22 beyond a certain point will cause stretching of the tension helical springs 40, such latter springs thus taking up part of the load imposed on the seat and hence relieving strain on the webbing. Since the springs 40 may be stretched in addition to the complete compression of foundation springs 22, the seat has great resiliency or cushioning effect. This action of the springs is permitted since the webbing 20 extends above the level of the wire and may be deflected or sagged a substantially equal amount below said level.

For further relieving strain on the webbing and to prevent the formation of a belly thereon, as for instance, at the front of the seat, a number of hooks 50 are attached to the inner surface of front frame wall 12, as by fastening means 51, said hooks having portions 52 engaging the lowermost convolutions 53 of said springs 22. Downward pressure on said foundation springs hence is partially taken up by the hooks 50, thus further relieving strain from the webbing.

It will be noted that since the rods 45 are rotatably journalled in the eyelets 42 which act as bearings therefor, side sway of the webbing such as usually occurs in upholstery of this character, couches for instance, will cause the rods to rotate slightly, friction or rubbing contact between the rods and webbing thus being substantially eliminated. Wear on said webbing and tearing thereof is thereby prevented, thus adding to the life of the upholstery.

Figure 5:
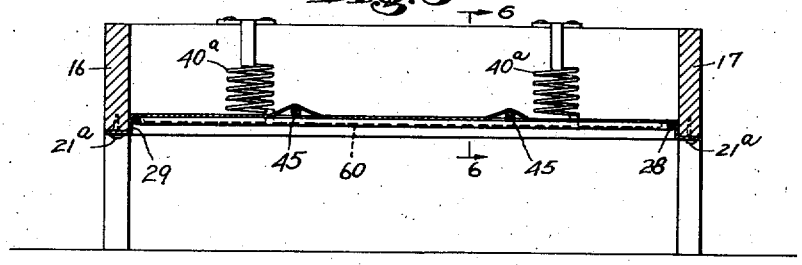
Fig. 5 is an elevational, cross-sectional view of the rear portion of a chair frame, showing a modified construction of the seat structure.
Figure 4:
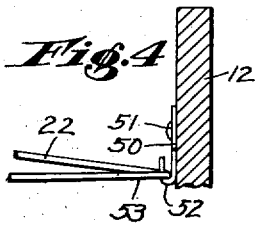
Fig. 4 is a fragmentary vertical cross-sectional view taken through the front wall of the frame and illustrating the means for fastening the lower end of the foundation springs to said wall.
Figure 6:
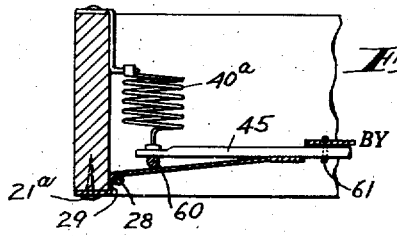
Fig. 6 is an enlarged cross-sectional view taken on line 6—6 of Fig. 5.

Figs. 5 and 6 of the drawing illustrate a modified construction in accordance with which the helical tension springs 40a similar to springs 40 are connected at the lower portions thereof to a rod 60 transverse to the rods 45. Said rods 45 may in turn be fixedly mounted at the end portions thereof to said transverse rod 60. With this construction the spring 40 and rods may be distributed as required. In incorporating the seat structure herein described into a couch for instance, a lesser number of rods 45 may be provided than springs 40a or vice versa. In accordance with this modified construction, the rods 45 may be secured to the webbing 20, as by loops 61 or in any other suitable manner, thus preventing side sway of the webbing.

It will thus be seen that there is provided a device in which the several objects of this invention are achieved, and which is well adapted to meet the conditions of practical use.

As various possible embodiments might be made of the invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. In upholstery construction of the character described, a frame, one piece webbing fixed at all four sides thereof to said frame, and means for maintaining said webbing out of the plane of the underside portion of said frame, said means comprising a rod, resilient means engaging the ends of said rod for resiliently suspending the same, from opposite sides of said frame, said rod engaging an intermediate portion of said webbing.

2. In upholstery of the character described, a frame, a one piece webbing secured directly to said frame and a rod resiliently suspended from said frame and having a portion extending thru openings in said webbing and contacting the underside thereof.

3. In upholstery of the character described a frame, a one piece webbing secured to said frame, compression springs mounted on said webbing, and a rod resiliently suspended from said frame and having a portion extending thru openings in said webbing and contacting the underside thereof and being disposed directly beneath said compression springs.

4. In upholstery of the character described, a frame, a one piece webbing secured to said frame and a rod resiliently suspended from said frame and having a portion extending thru openings in said webbing and contacting the underside thereof, said rod normally being in a plane above the level of the underside of said frame.

5. In upholstery of the character described, a seat frame, webbing secured thereto, and means including a rod resiliently suspended from said frame for lifting an intermediate portion of said webbing above the level of the underside of said frame, and means for attaching a portion of said webbing to the inner side of said frame at a point above the underside of said frame, and below the normal level of said rod.

6. In upholstery of the character described, a frame, a one piece webbing secured to said frame, compression springs mounted on said webbing, a member contacting the underside of the webbing, a spring member normally having an upward tension on the upper side of said webbing attached to said frame and being connected to said first member, one of said members extending through an opening in said webbing whereby an upward tension is obtained to aid in the support of said webbing.

7. In upholstery construction, a frame, a one-piece textile fabric webbing for said frame secured at substantially the entire margin thereof directly to said frame adjacent the lower edge of the latter, coil foundation springs on said webbing, means disposed beneath and engaging a portion of the webbing inward of said margin thereof and movable therewith, and flexible means disposed above said webbing, connected to a portion of the frame above said lower edge, and to said first means to aid in supporting weight imposed on said webbing.

8. In upholstery construction, a frame having upstanding walls, a one-piece, textile fabric webbing secured at substantially the entire margin thereof to the frame adjacent the bottom edge of the latter, an elongated member lying against and contacting a portion of the underside of said webbing spaced from any marginal edge of said webbing and movable therewith as said webbing flexes in opposite directions, and a flexible member disposed above the webbing and between the walls of the frame and being connected to a portion of the frame above the level of the webbing and also connected to said first member to aid in supporting weight imposed on the webbing, one of said members extending through said webbing.

9. In upholstery construction, a frame, a one piece flexible fabric webbing entirely covering the frame opening, the marginal edges of said webbing coinciding with and being attached directly to said frame adjacent the lower edge of the latter, coil foundation springs on said webbing, and means for supporting an intermediate portion of the webbing inward of all its marginal edges to aid in supporting weight imposed on said foundation springs and prevent excessive sagging, said means including an intermediate portion disposed beneath the mid-portion of the webbing, and flexible portions extending from said intermediate portion, disposed above the webbing and secured to opposite walls of the frame at a substantial distance above said webbing.

10. In upholstery construction of the character described, a frame, a one-piece webbing secured to the underside of said frame, a straight member lying against and contacting the underside of said webbing, and a resilient member disposed on the upper side of said webbing and being connected to said first member and to the upper side of said frame, one of said members extending through said webbing for connection to the other.

11. In upholstery construction, a frame, a one-piece webbing secured at the margin thereof to the lower edge of said frame, a pair of members contacting the underside of said webbing inwardly of the margin of said webbing, a member transverse to said first two members and contacting the same, and resilient means attached at one end to the upper edge of the frame and disposed above the webbing, said resilient means being attached at the other end thereof to said transverse member for exerting a yielding upward pressure on said webbing.

12. In upholstery construction, a frame having front, rear and end vertical walls and supported on legs, a one-piece textile fabric webbing secured at the margin thereof directly to the underside of said frame, a plurality of foundation springs mounted on said webbing, means for tying the upper ends of said foundation springs to said frame, means engaging said webbing at a portion thereof spaced inwardly of the frame walls and movable therewith, and flexible means disposed between the walls of the frame and above the webbing and anchored to the upper portion of the frame and engaging said first means to provide an auxiliary support for weight imposed upon the foundation springs.

ALBERT M. BANK.